Dec. 2, 1969         E. E. COVERT         3,482,123

APPARATUS FOR REGULATING THE POWER OUTPUT OF A MHD GENERATOR

Filed Dec. 28, 1967

EUGENE E. COVERT
INVENTOR.

BY

*Ernest J. Peterson*
AGENT

United States Patent Office 3,482,123
Patented Dec. 2, 1969

3,482,123
APPARATUS FOR REGULATING THE POWER OUTPUT OF A MHD GENERATOR
Eugene E. Covert, Belmont, Mass., assignor to Hercules Incorporated, Wilmington, Del., a corporation of Delaware
Filed Dec. 28, 1967, Ser. No. 694,341
Int. Cl. H02k 45/00
U.S. Cl. 310—11                     7 Claims

ABSTRACT OF THE DISCLOSURE

An apparatus for regulating the power output of a MHD generator having in combination, two opposite dielectric fixed walls, two opposite dielectric flexible walls adjustable in contour, each of said flexible walls containing a plurality of segmented electrodes, and means for adjusting the contour of the flexible walls to regulate the power generated by the passage of ionized gas over the electrodes. A local voltage or a local current sensor that is compared with the power generated is included as a feedback network for adjustment of the contour of the flexible walls in response to the local power generated.

---

This invention relates generally to magnetohydrodynamic (MHD) power generation and more particularly concerns apparatus for regulating the power output of a MHD generator.

Most commercial electric generator systems supply constant voltage electric power. This operating characteristic is achieved by changing the rate of fuel consumption, by changing an auxiliary load, or by by-passing some of the working fluid. The constant voltage operating characteristic can be achieved by changing the amount of power that is fed into the magnetic field coils. If the generator is self-excited, then changing the field corresponds, in part, to changing the auxiliary load. Since MHD generators are intended for commercial use, it follows that it will be desirable to be able to control the voltage output of these generators. However, discussion of this problem in the literature has been lacking. This suggests that the standard procedures referred to above have heretofore been considered to control the output of a MHD generator. However, MHD generators may be controlled by additional means. This comes about because the output voltage (V) is proportional to the product of the fluid velocity (U), the magnetic field (B) and the channel height (h). The fluid velocity and channel height are related through fluid mechanics. Thus, the voltage can be regulated by controlling the velocity of the working fluid as it passes through the power production section of the MHD generator. The velocity, in turn, can be controlled through the use of flexible walls. The use of flexible walls is a standard procedure in wind tunnel operations, and it has been suggested for thrust control. However, there is no suggestion in the literature that the flexible wall can be applied to a MHD generator for voltage regulation.

The type of voltage regulation contemplated by the present invention operates in two modes. When the regulator operates in the first mode, voltage variation of nearly two may be controlled. In this mode, the system of this invention is comparable with commercial systems utilizing change in fuel combustion rate. The second mode has a fairly fast response for small changes in load. In this mode, the system is comparable with commercial systems utilizing load switching and by-passing of working fluid for this amount of control.

The first mode or coarse mode of regulation, according to this invention, comes about by moving the wall near the throat of the channel. The second mode of regulation comes about by moving the wall in the neighborhood of the individual electrodes. In operation the two modes of operation will be intermixed; thus the separation into modes is a convenience for visualization and discussion. These two modes can be termed coarse and fine regulation.

It is a primary object of the invention to provide apparatus for control of power in a MHD generator. Generally stated, this object is realized in accordance with the invention by the provision of means to vary the contour of a flexible tunnel wall containing multi-electrodes. Controlled electric MHD power under sustained feeding of ionized gas or short duration power pulses as generated by explosive charges has many applications including the feeding of electrical power to radar sets, sonar systems, X-ray sources, laser light pumps, emergency communication systems and the like.

Other objects and advantages of the invention will appear hereinafter the novel features and combinations being more fully understood with reference to the accompanying drawings wherein reference symbols refer to like parts wherever they occur and wherein.

Figure 1:
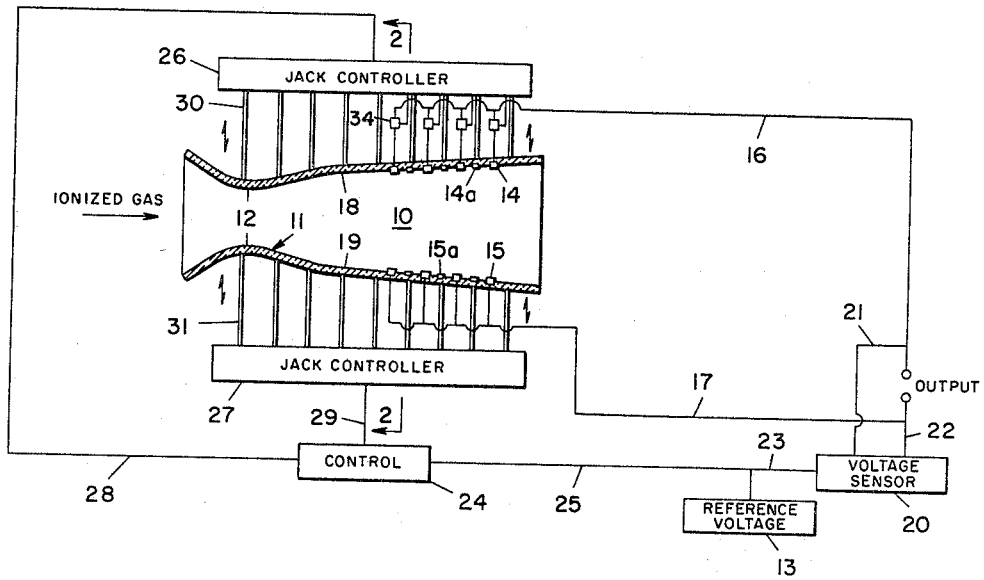
FIG. 1 is a side elevation taken in section through a typical apparatus for practicing the invention in respect to a Faraday connected MHD generator.

For purposes of description of the coarse regulation, the Faraday connected MHD generator depicted in FIG. 1 comprises a working section 10 having a nozzle 11 whose throat size 12 controls the flow of ionized gas through the working section. The output voltage from the working section 10 is compared with a desired or reference voltage 13. The difference between these two voltages is used to control the throat geometry of the nozzle 11 that in turn alters the velocity of the gas passing through the working section 10. Since the output voltage delivered by multi-electrodes 14 and 15 through power cables 16 and 17 depends upon the velocity of the gas passing through the working section 10, the output voltage is changed as the velocity is changed. Thus, the regulator basically comprises the reference voltage 13, flexible tunnel walls 18 and 19 supporting the flush or projected (as shown) multi-electrodes 14 and 15 and insulators 14a and 15 a, respectively, control means for moving the tunnel walls 18 and 19, and a feed-back network including a voltage sensor 20 connected across output power cables 16 and 17 by lines 21 and 22 and to reference voltage 13 by line 23 which in conjunction with the control means adjusts the tunnel walls 18 and 19 so that the output voltage approaches or substantially equals the reference voltage 13.

It will be appreciated that the control means is automatically operated for adjusting the tunnel walls and that systems used in wind tunnel work for adjusting the walls may be utilized. In the apparatus depicted in FIGS. 1 and 2, a control 24 responsive through line 25 to the difference between reference voltage 13 and voltage sensor 20 serves to operate jack controllers 26 and 27 through lines 28 and 29. Extending from the jack controllers 26 and 27 are a plurality of jacks 30 and 31, respectively, secured to tunnel walls 18 and 19. These jacks move the tunnel walls 18 and 19 in and out sliding along insulated fixed walls 32 and 33 and the means of activation of the jacks may be by servo-motors either hydraulic or electric or a combination thereof. Since such activation systems are well understood in the art, they are not further described here. An additional important feature of the invention, however, resides in the interpositioning of a plurality of local sensing elements 34 that compare the local current output with the current from the most upstream electrode. The local elements also contain a switch that can be mechanical, in the form of a gas filled tube such as an ignition, or in the form of a semiconductor rectifier acting as a solid state analogue of the gas filled tube. The function of the local elements 34, as previously mentioned, pertains to the second mode of operation as an adjunct thereto which gives a fast response for small changes in load by load switching and by-passing of the working fluid. Thus, in instances where the first or coarse mode of regulation is not completely optimized by the electrodeless wall spacing and the second or fine mode of regulation is not completely optimized by the electrode wall spacing, the elements 34 additionally contribute to obtain the referenced regulation.

More specifically, the elements 34 allow the power to be distributed uniformly along the channel. If the current in any electrode is too high the flexible walls are opened locally and if the local current is too low the walls are closed locally. The local elements 34 contribute to this control by comparing the local current density with the current density in the most upstream electrode. Thus, the jack positions extend all the way along from the throat to the end of the generator section and provide means for contouring the entire section rather than utilizing a uniform to and fro movement. Furthermore, segmented electrodes 14 and 15 are utilized so that any electrode pair that cannot be regulated can be removed from the circuit by the switching element.

Alternately the local sensing element 34 can contain a voltage detector that compares the local output voltage with the voltage on power cable 16 and the difference in voltage passes through a shaping network that acts as a feedback control to actuate the jacks to hold the voltage constant across each electrode pair. In this modification the switching circuit in the element 34 still serves to remove the electrodes from the circuit if they cannot be regulated.

Figures 2, 3:
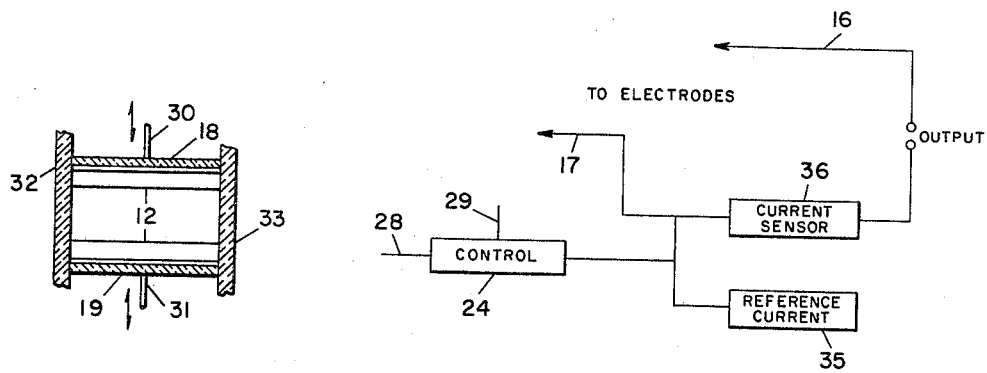
FIG. 2 is a fragmentary section of the apparatus taken on line 2—2 of FIG. 1.
FIG. 3 is a diagram showing an alternate arrangement for operating the apparatus of FIGS. 1 and 2 in respect to a Hall connected MHD generator.

With reference to FIG. 3, it will be appreciated that the invention is equally applicable in conjunction with a Hall connected MHD generator. In this embodiment, a reference current 35 and a current sensor 36 is connected to the control unit 24 as shown in lieu of the reference voltage and voltage sensor heretofore described. The response of the control means and operation of the system for regulating current is thereby similar to that for regulating voltage.

The following is presented as an example for practicing the invention as particularly directed to voltage regulation.

Flexible walls have been used for controlling the Mach number in wind tunnels and hence velocity for a number of years. The basic idea behind the use of flexible walls can be developed from the conservation laws. At high pressures in a channel with slowly varying height (area in three dimensions) the relation between the velocity $u$ and the channel height, $h$, is $$\frac{du}{u} = \frac{1}{M^2-1}\frac{dh}{h} \qquad (1)$$

where:
$u$ = local mass velocity at cross section under discussion
$h$ = local channel height
$M$ = local Mach number Overall control of velocity is controlled at the throat where the Mach number is near unity. Hence, a small change in $h$ has a large effect on $u$. This is desirable because it means that small jack movement can have a profound effect on velocity. In the generator section where the Mach number is about two the percent change in velocity is less than the change in channel height. The table below shows the relation for $\gamma \simeq 1.3$

| $h/h_{\text{THROAT}}$ | 1.19 | 1.04 | 1.00 | 1.01 | 1.04 | 1.27 | 1.48 |
| $u/u_{\text{THROAT}}$ | 0.629 | 0.824 | 1.00 | 1.20 | 1.41 | 1.45 | 1.64 |

The output voltage of the generator (V) follows the load line $$V = uBh \cdot \frac{R}{1+R} \qquad (2)$$

where $$R = \frac{\text{External or Load Resistance}}{\text{Internal Resistance}}$$

Logarithmic differentiation gives (if B is constant)

$$\frac{\delta V}{V} = \frac{\delta u}{u} + \frac{\delta h}{h} + \frac{\delta R}{R(1+R)}$$

But $$R = \delta\left(\frac{R_{\text{ext}}}{R_{\text{int}}}\right) = \frac{\delta R_{\text{ext}}}{R_{\text{int}}} - R\frac{\delta R_{\text{int}}}{R_{\text{int}}}$$

$$= R\left[\frac{\delta R_{\text{ext}}}{R_{\text{ext}}} - \frac{\delta h}{h}\right]$$

since $$R_{\text{int}} = \frac{h}{\delta A}$$

($A$ = electrode area.)

Substituting for ($\delta R/R$) and using the relation between $u$ and $h$ gives $$\frac{\delta v}{v} = \left\{\frac{1}{M^2-1} + \frac{R}{1+R}\right\}\frac{\delta h}{h} + \frac{1}{1+R}\frac{\delta R_{\text{ext}}}{R_{\text{ext}}} \qquad (3)$$

Thus for a constant voltage machine ($\delta v = 0$) the relation between the change in the load and the channel height is $$\frac{\delta h}{h} = -\frac{M^2-1}{RM^2=1} \cdot \frac{\delta R_{\text{ext}}}{R_{\text{ext}}} \qquad (4)$$

Equation 4 represents the control law that must be followed if the height change is to compensate for the change in the external load. If the controller cannot null the voltage change the local element is arranged to open the circuit of each pair of electrodes starting from the most downstream.

Figure 4:
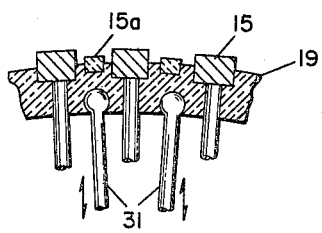
FIG. 4 is an enlarged fragmentary section showing the flexible wall, insulators, electrodes, power cables and jack connections in respect to the flexible tunnel wall depicted in FIGS. 1 and 2.

The voltage regulator for the Faraday connected MHD generator consists essentially of the dielectric flexible walls 18 and 19—that serves as a base for the electrodes 14 and 15 and the insulators 14a and 15a and serves as a structure for pressure seal of gas and cooling tubes (not shown). The arrangement of the flexible tunnel wall, electrodes, insulators, leads to power cable, and jacks is illustrated in FIG. 4 which is an enlarged fragmentary section taken through the lower flexible wall 19, it being appreciated that the upper wall 18 is similarly constructed and activated. The electrodes and the insulators are slightly separated to allow for bending of the flexible wall. The side edges of the flexible wall seal against the insulating walls 32 and 33 (FIG. 2) to confine the working fluid. The insulating wall likewise contains cooling tubes (not shown). The position and contour of the flexible wall is determined by the number of jacks. The usual techniques employed in flexible-walled-wind tunnels can be used to position the jacks and maintain transverse rigidity. The power supply for each jack is connected to the jack controller, and a current measuring and comparing element 34. If the load is reduced the current density sensing element causes each jack to move the flexible walls outward. If the load is increased the flexible walls will be moved inward. If the jacks reach the inner or outer limit or if the voltage changes, the jack controller also operates the throat jacks to reduce or increase the velocity, respectively. Should these adjustments be inadequate, the current measuring and comparing element will cause each set of electrodes to be disconnected from the circuit starting with the most downstream. Should the generator be unable to maintain voltage because of too small a load resistance, opening the electrode circuit will cause the generator to unload itself. If on the other hand, the generator can maintain the voltage and current with a smaller number of electrodes by virtue of coming from a high loading state to a lesser loading state, the failure to maintain voltage on the downstream electrodes may be due to flow separation. Opening the switch will then allow the generator to continue to operate effectively.

The current supplied to the load in a Hall connected generator is described by $$I = JA = \left[\frac{\sigma\omega\pi}{1+(\omega\tau 2)}\right] uBh \frac{R}{1+R} \quad (5)$$

This equation is similar in structure to Equation 2. Hence, the current output from a Hall generator can be regulated in the same manner as the voltage from a Faraday generator.

Other modifications include the use of movable electrodes in place of the movable wall. This offers the advantages of the flexible wall, but unless the insulation sections are also moved, the flow process will be degraded If both the electrodes and the insulators are moved together then the assembly is much more complicated than the preferred flexible wall construction as presented here.

The advantage offered by this invention over the prior art is that the present voltage regulator avoids the problem of adjusting the plant electrical load to match the changing external load. The present regulator extracts that amount of power from the fluid that is needed. The present regulator is an integral part of the generator and therefore does not require a large amount of extra space. This provides an advantage of having the entire unit as one assembly. Finally the use of the segmented electrodes allows the generator to be loaded uniformly along its length. No thermodynamic or fluid mechanical process is fixed by the regulator itself. Hence, the regulator affords the additional advantage of being set up to conform to the most efficient operation.

What I claim and desire to protect by Letters Patent is:

1. Apparatus for regulating the power output of a MHD generator having in combination,
   (a) two opposite dielectric fixed walls,
   (b) two opposite dielectric flexible walls adjustable in contour, each of said flexible walls containing a plurality of segmented electrodes, and
   (c) means for adjusting the contour of the flexible walls to regulate the power generated by the passage of ionized gas over the electrodes.

2. Apparatus for regulating the voltage output of a MHD generator having in combination,
   (a) two opposite dielectric fixed walls,
   (b) two opposite dielectric flexible walls adjustable in contour, each of said flexible walls containing a plurality of segmented electrodes, and
   (c) means for adjusting the contour of the flexible walls to regulate the line voltage generated by the passage of ionized gas over the electrodes.

3. The apparatus of claim 2 which includes a local voltage sensor that is compared with the line voltage as a feedback network for adjustment of the contour in response to the local voltage generated.

4. The apparatus of claim 3 which includes switching elements connected to the electrodes for effecting charge removal from the circuit of any electrode not responding to the contour adjustment.

5. Apparatus for regulating the current output of a MHD generator having in combination,
   (a) two opposite dielectric fixed walls,
   (b) two opposite dielectric flexible walls adjustable in contour, each of said flexible walls containing a plurality of segmented electrodes, and
   (c) means for adjusting the contour of the flexible walls to regulate the line current generated by the passage of ionized gas over the electrodes.

6. The apparatus of claim 5 which includes a local current sensor that is compared with the line current as a feedback network for adjustment of the contour in response to the local current generated.

7. The apparatus of claim 6 which includes switching elements connected to the electrodes for effecting charge removal from the circuit of any electrode not responding to the contour adjustment.

References Cited
UNITED STATES PATENTS 3,339,092    8/1967    Frolich _____ 310—11

DAVID X. SLINEY, Primary Examiner